US007731846B1

(12) United States Patent
Jones

(10) Patent No.: US 7,731,846 B1
(45) Date of Patent: Jun. 8, 2010

(54) GREASE COLLECTION SYSTEM

(76) Inventor: Robert E. Jones, 26796 Country Acre Dr., Sioux Falls, SD (US) 57106

( * ) Notice: Subject to any disclaimer, the term of this patent is extended or adjusted under 35 U.S.C. 154(b) by 352 days.

(21) Appl. No.: 11/800,267

(22) Filed: May 7, 2007

Related U.S. Application Data

(63) Continuation-in-part of application No. 10/436,482, filed on May 12, 2003, now abandoned.

(51) Int. Cl.
*B01D 35/02* (2006.01)

(52) U.S. Cl. ............................ 210/257.2; 4/638; 4/650; 4/652; 4/654; 4/679; 210/248; 210/459; 210/460

(58) Field of Classification Search ................... 99/408, 99/425, 444–446; 210/136, 149, 257.2, 416.1, 210/448, 538–541, 742, 459, 460, 248; 4/619, 4/629, 638, 643, 650–654, 679, 696
See application file for complete search history.

(56) References Cited

U.S. PATENT DOCUMENTS 2,353,993 A 7/1944 Cavicchioli
2,961,914 A 11/1960 Young
4,254,311 A 3/1981 Sisk, Jr.
4,517,886 A 5/1985 Bales
4,555,339 A 11/1985 Graves et al.
4,689,840 A 9/1987 Muck et al.
4,847,927 A 7/1989 Blane
4,909,137 A 3/1990 Brugnoli
5,372,718 A 12/1994 Zebian
5,405,538 A 4/1995 Batten
5,409,615 A 4/1995 Wallman et al.
5,713,265 A 2/1998 Strader et al.
5,799,645 A 9/1998 Strader et al.
6,098,813 A 8/2000 Cini
6,261,462 B1 7/2001 Batten
6,355,168 B1 3/2002 White
6,415,710 B1 7/2002 Boone
6,491,830 B1 12/2002 Batten et al.

*Primary Examiner*—Joseph W Drodge
(74) *Attorney, Agent, or Firm*—Jeffrey A. Proehl; Woods, Fuller, Shultz and Smith, P.C.

(57) ABSTRACT

A grease collection system for collecting and storing cooking grease for disposal by a user. The grease collection system includes an inlet assembly being designed for being coupled to a cabinet. The inlet assembly is designed for receiving the cooking grease to be disposed of by the user. A collection assembly is in fluid communication with the inlet assembly whereby the collection assembly is designed for receiving and storing the cooking grease from the inlet assembly to be selectively disposed of by the user. A hose member is fluidly coupled between the inlet assembly and the collection assembly. The hose member provides fluid communication between the inlet assembly and the collection assembly whereby the hose member is designed for permitting the cooking grease to flow from the inlet assembly to the collection assembly when the inlet assembly receives the cooking grease from the user.

20 Claims, 6 Drawing Sheets

GREASE COLLECTION SYSTEM

CROSS REFERENCE TO RELATED APPLICATION

This application is a continuation-in-part of application Ser. No. 10/436,482, filed May 12, 2003, now abandoned.

BACKGROUND OF THE INVENTION

1. Field of the Invention

The present invention relates to grease transfer systems and more particularly pertains to a new grease collection system for collecting and storing cooking grease for disposal by a user.

2. Description of the Prior Art

The use of grease transfer systems is known in the prior art. U.S. Pat. No. 5,713,265 describes a system for collecting the grease and other fluids produced during cooking. Another type of grease transfer system is U.S. Pat. No. 4,847,927 having a garbage collection device for a built in sink unit to allow garbage to be collected and compacted to facilitate storage of the garbage until the user is ready to dispose of the garbage. U.S. Pat. No. 4,909,137 has a grease pan positioned between the cooking food product and the heat producing element to allow the grease pan to collect grease and fluids from the food product and funnels grease and fluids away to a grease reservoir. U.S. Pat. No. 4,517,886 has a collection container that is coupled to a range and collects grease and fluids produced during the cooking process. U.S. Pat. No. 4,555,339 has a pot including inner and out cylindrical containers and a strainer to strain debris from the grease being poured into the inner cylindrical container. U.S. Pat. No. 4,689,840 has a sink with a waste opening and a waste bin where waste can be dropped into the waste opening and deposited in the waste bin to be disposed of at a later date. U.S. Pat. No. 4,254,311 has a receptacle for collecting liquid is carried on a support to move in accordance with the liquid in the receptacle. U.S. Pat. No. 5,799,645 has an apparatus for cleaning grease and other obstacles blocking grease-carrying conduits. U.S. Pat. No. 6,355,168 has a cooking oil storage and filtering system for filtering and storing used cooking oil prior to reuse of the cooking oil. U.S. Pat. No. 6,415,710 has a system for use with a portable cooking device that allows for grease and fluids from the cooking device to be collected and stored for disposal. U.S. Pat. No. 6,491,830 has a separation apparatus for separating water from grease and oil.

While these devices fulfill their respective, particular objectives and requirements, the need remains for a system that has certain improved features for facilitating collection and storage of cooking grease to be disposed by the user at a later time.

SUMMARY OF THE INVENTION

The present invention meets the needs presented above by providing an inlet assembly that is coupled to the cabinet and receives the cooking grease with the hose member directing the cooking grease to the collection assembly.

Still yet another object of the present invention is to provide a new grease collection system that provides a funnel member that engages the inlet assembly to facilitate pouring of the cooking grease into the inlet assembly.

Even still another object of the present invention is to provide a new grease collection system that has a meat draining member that is selectively coupled to the funnel member to receive cooked meat and allow the grease to drain away from the meat.

To this end, the present invention generally comprises an inlet assembly being designed for being coupled to a cabinet whereby the inlet assembly is positioned proximate a sink. The inlet assembly is designed for receiving the cooking grease to be disposed of by the user. A collection assembly is in fluid communication with the inlet assembly whereby the collection assembly is designed for receiving and storing the cooking grease from the inlet assembly to be selectively disposed of by the user. A hose member is fluidly coupled between the inlet assembly and the collection assembly. The hose member provides fluid communication between the inlet assembly and the collection assembly whereby the hose member is designed for permitting the cooking grease to flow from the inlet assembly to the collection assembly when the inlet assembly receives the cooking grease from the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
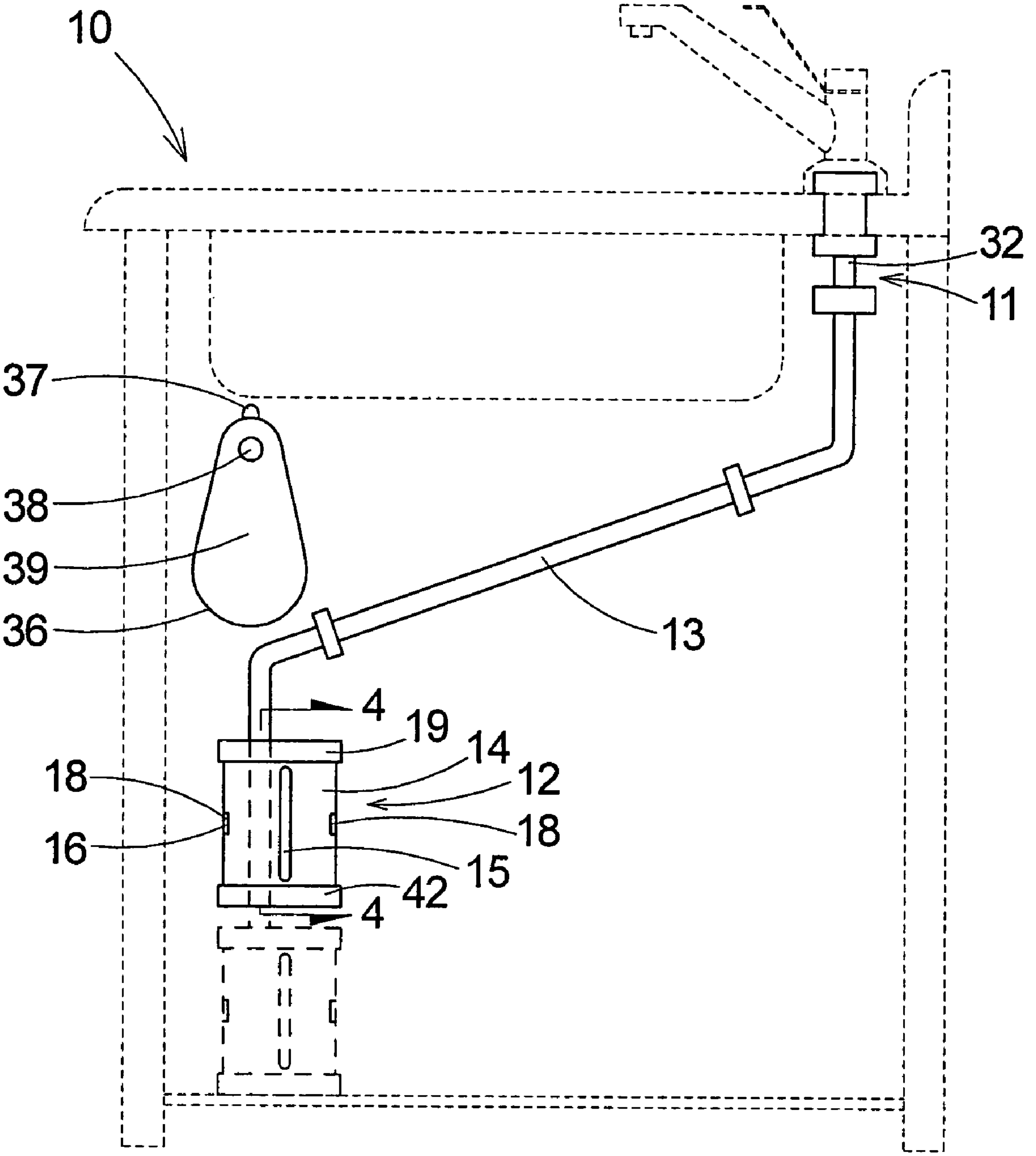
FIG. 1 is a side view of a new grease collection system according to the present invention shown in position on a cabinet.

With reference now to the drawings, and in particular to FIGS. 1 through 6 thereof, a new grease collection system embodying the principles and concepts of the present invention and generally designated by the reference numeral 10 will be described.

As best illustrated in FIGS. 1 through 6, the grease collection system 10 generally comprises an inlet assembly 11 being designed for being coupled to a cabinet whereby the inlet assembly 11 is positioned proximate a sink. The inlet assembly 11 is designed for receiving the cooking grease to be disposed of by the user. The inlet assembly 11 may also be positioned in the flanging around the sink and on either side that provides the most convenience for the user.

A collection assembly 12 is in fluid communication with the inlet assembly 11 whereby the collection assembly 12 is designed for receiving and storing the cooking grease from the inlet assembly 11 to be selectively disposed of by the user.

A hose member 13 is fluidly coupled between the inlet assembly 11 and the collection assembly 12. The hose member 13 provides fluid communication between the inlet assembly 11 and the collection assembly 12 whereby the hose member 13 is designed for permitting the cooking grease to flow from the inlet assembly 11 to the collection assembly 12 when the inlet assembly 11 receives the cooking grease from the user.

The collection assembly 12 comprises a canister member 14. The canister member 14 is selectively coupled to the hose member 13 opposite the inlet assembly 11 whereby the canister member 14 is designed for receiving the cooking grease through the hose member 13 when the inlet assembly 11 receives the cooking grease from the user. The canister member 14 comprises a window member 15 whereby the window member 15 permits the user to view into the canister member 14 to determine the amount of cooking grease collected in the canister member 14. The window member 15 of the canister member 14 comprises a transparent material whereby the transparent material is designed for permitting the user to view into the canister member 14 and observe the level of the cooking grease collected in the canister member 14.

The collection assembly 12 comprises a bracket member 16. The bracket member 16 is designed for being coupled to an interior of the cabinet. The bracket member 16 selectively receives the canister member 14 whereby the bracket member 16 is designed for selectively securing the canister member 14 to the cabinet to inhibit inadvertent repositioning of the canister member 14 with respect to the hose member 13.

The bracket member 16 of the collection assembly 12 comprises a base portion 17 and a pair of arm portions 18. The base portion 17 is designed for being secured to the interior of the cabinet whereby the base portion 17 is for securing the bracket member 16 to the cabinet. Each of the arm portions 18 is oppositely coupled to the base portion 17 whereby the arm portions 18 are positioned around a portion of the canister member 14 to inhibit movement of the canister member 14 with respect to the hose member 13.

The collection assembly 12 comprises a lid member 19. The lid member 19 selectively engages the canister member 14 and the hose member 13 whereby the lid member 19 is positioned between the hose member 13 and the canister member 14. The hose member 13 extends through an access aperture 20 extending through the lid member 19 whereby the lid member 19 is for maintaining alignment of the hose member 13 with the canister member 14.

A pair of indexing members 21 are selectively coupled to the hose member 13. The lid member 19 is positioned between the indexing members 21 whereby the indexing members 21 are for limiting movement of the lid member 19 along the hose member 13 when the canister member 14 is removed to allow the canister member 14 to be emptied. The hose member 13 comprises a plurality of annular indexing channels 22 whereby each of the indexing members 21 selectively engages one of the annular indexing channels 22 to retain positioning of the indexing members 21.

A check valve 23 is coupled to one of the indexing members 21. The check valve 23 is designed for restricting flow of the cooking grease from the hose member 13 when the canister member 14 is removed to allow for disposal of the cooking grease collected in the canister member 14. The check valve 23 comprises a door member 24 and a float member 25. The door member 24 is hingably coupled to the associated one of the indexing members 21. The float member 25 is coupled to the door member 24 whereby the float member 25 is designed for floating on the cooking grease when the cooking grease has reached a pre-determined level to force the door member 24 against the associated one of the indexing members 21 to inhibit the cooking grease from further dispensing from the hose member 13.

The collection assembly 12 comprises a bag member 26. The bag member 26 is selectively inserted in the canister member 14. The bag member 26 is designed for receiving the cooking grease being stored in the canister member 14 whereby the bag member 26 is for being selectively discarded to dispose of the cooking grease collected in the canister member 14.

The bag member 26 comprises a peripheral wall 27. The peripheral wall 27 defines an interior space 28 of the bag member 26. The interior space 28 of the bag member 26 comprises an open end 29 whereby the open end 29 is designed for permitting the cooking grease to enter into the interior space 28 of the bag member 26.

The bag member 26 comprises a seal portion 30. The seal portion 30 is coupled to the peripheral wall 27 whereby the seal portion 30 is positioned proximate the open end 29 of the interior space 28 of the bag member 26. The seal portion 30 is for selectively sealing the open end 29 of the interior space 28 to inhibit the cooking grease from inadvertently leaking from interior space 28 of the bag member 26.

The collection assembly 12 comprises a plurality of bag clip members 31. Each of the bag clip members 31 is selectively coupled to the canister member 14 whereby the bag clip members 31 are for pinching the peripheral wall 27 of the bag member 26 between the bag clip members 31 and the canister member 14 to maintain positioning of the bag member 26 in the canister member 14.

The inlet assembly 11 comprises a port member 32. The port member 32 is designed for being coupled to the cabinet. The port member 32 comprises a bore 33 extending through the port member 32 whereby the bore 33 is designed for permitting the cooking grease to be poured through the port member 32 by the user. The hose member 13 is coupled to the port member 32 whereby the hose member 13 is in fluid communication with the bore 33 of the port member 32 to allow the cooking grease passing through the bore 33 of the port member 32 to flow to the collection assembly 12. A retaining nut 34 threadably engages the exterior of the port member 32 whereby the retaining nut 34 is designed for compressing the cabinet between the retaining nut 34 and a flange of the port member 32 to mount the port member 32 to the cabinet.

The inlet assembly 11 comprises a plug member 35. The plug member 35 threadably engages the port member 32 whereby the plug member 35 is selectively positioned in the bore 33 of the port member 32. The plug member 35 is for inhibiting access to the bore 33 of the port member 32 when the plug member 35 is positioned in the bore 33 of the port member 32. The plug member 35 is also designed for inhibiting odor from escaping from the port member 32.

A funnel member 26 selectively engages the port member 32 whereby the funnel member 26 is in fluid communication with the port member 32. The funnel member 26 is designed for funneling the cooking grease into the bore 33 of the port member 32 to facilitate disposing of the cooking grease. A hook member 37 is designed for being placed in the cabinet. The hook member 37 is for receiving the funnel member 26 to store the funnel member 26 when the funnel member 26 is not in use.

The funnel member 26 comprises a neck portion 38 and a funnel portion 39. The funnel portion 39 is coupled to the neck portion 38. The neck portion 38 threadably engages the port member 32 whereby the neck portion 38 is selectively positioned in the bore 33 of the port member 32 to inhibit the funnel member 26 from inadvertently disengaging the port member 32 when the user is pouring cooking grease into the funnel member 26. The funnel portion 39 is designed for receiving the cooking grease whereby the funnel portion 39 funnels the cooking grease into the neck portion 38 of the funnel member 26.

A meat draining member 40 is selectively coupled to the funnel member 26. The meat draining member 40 comprises a plurality of drain apertures 41 extending through the meat draining member 40 whereby the drain apertures 41 permit fluid communication between the meat draining member 40 and the funnel member 26. The meat draining member 40 is designed for receiving a piece of cooked meat whereby the drain apertures 41 permit grease from the cooked meat to drain away from the cooked meat and into the funnel member 26.

Figure 2:
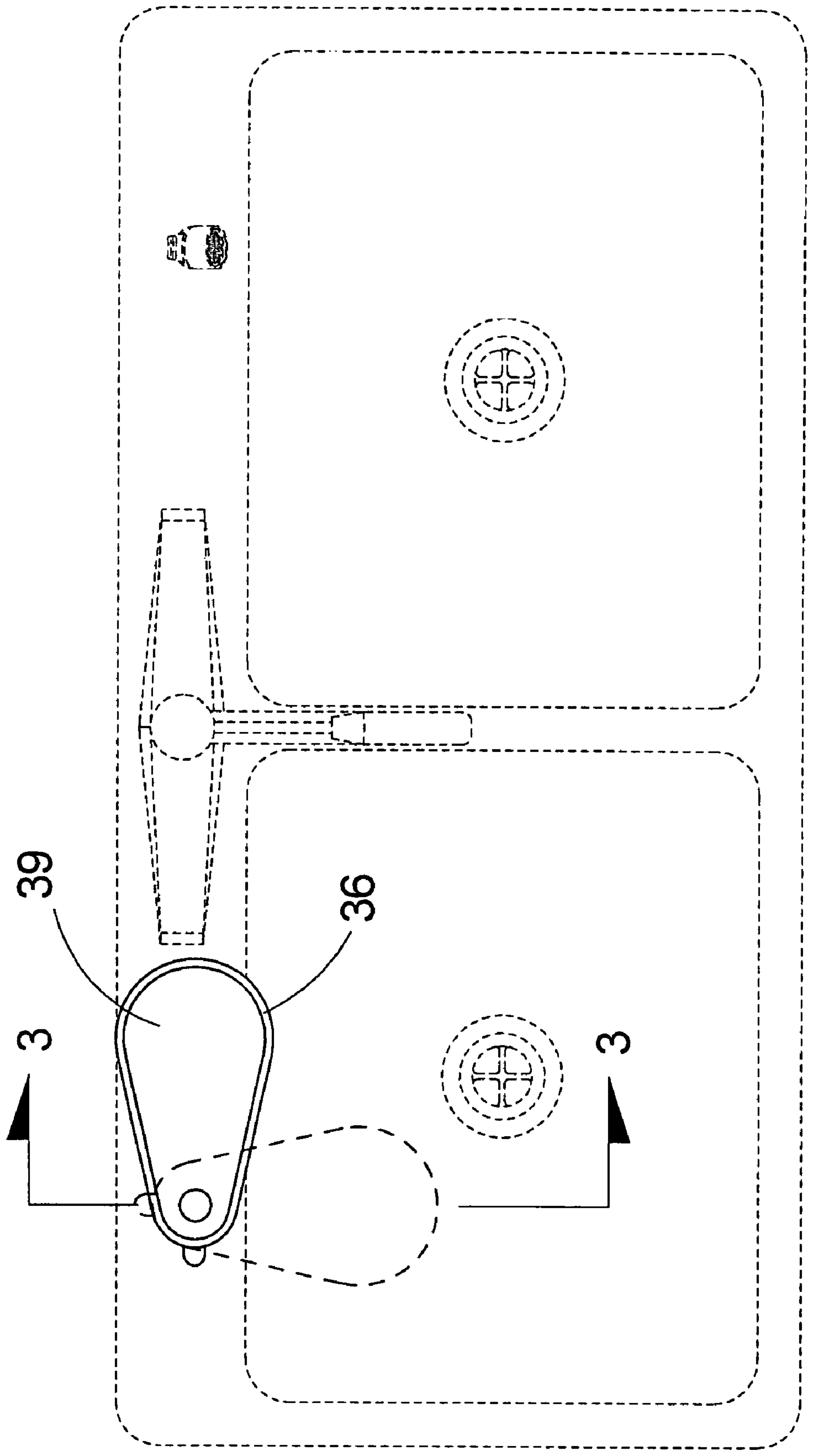
FIG. 2 is a top view of the inlet assembly and the funnel member of the present invention.
Figure 3:
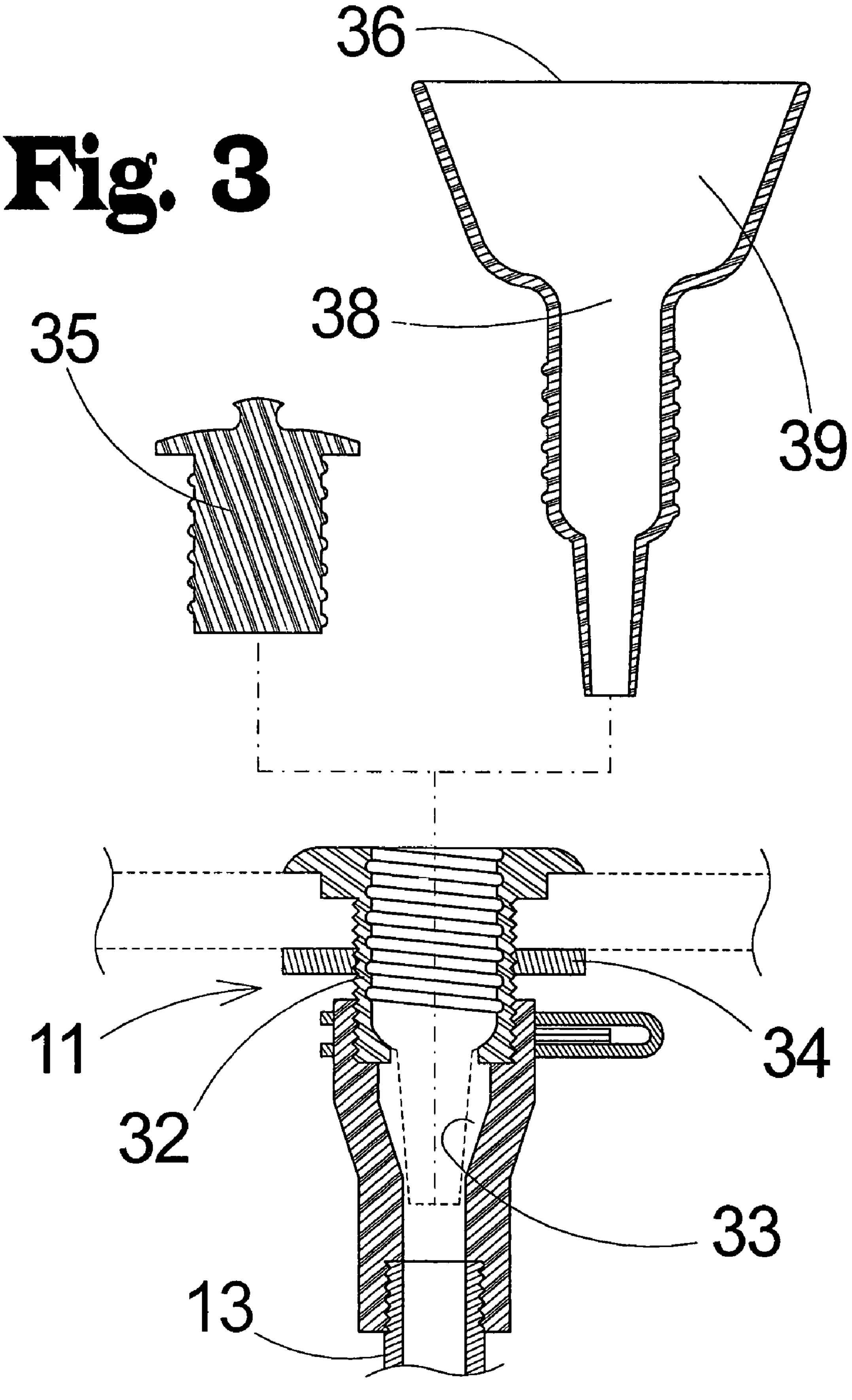
FIG. 3 is an exploded cross-sectional view of the present invention taken along line 3-3 of FIG. 2.
Figure 4:
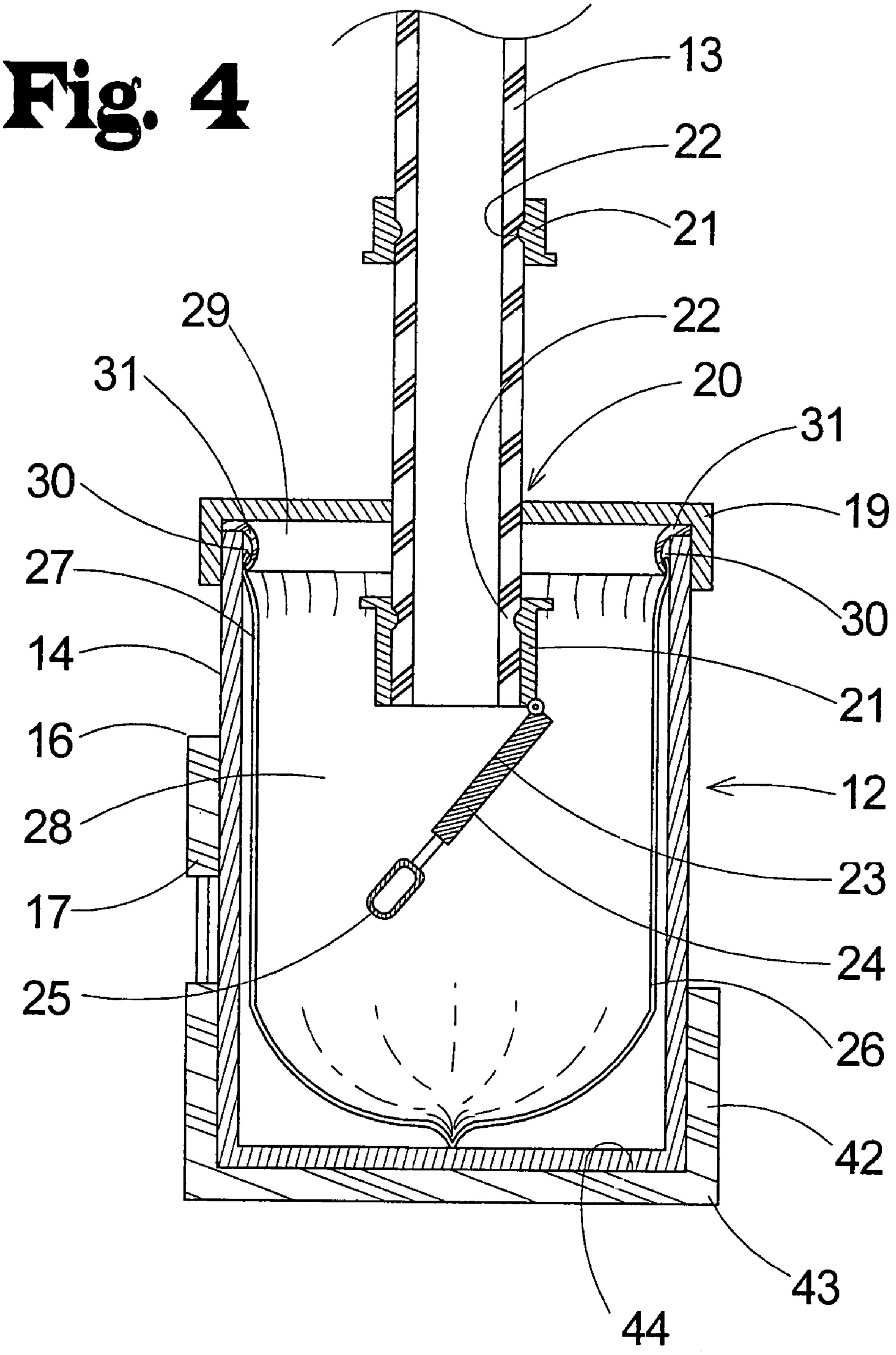
FIG. 4 is a cross-sectional view of the present invention taken along line 4-4 of FIG. 1.
Figure 5:
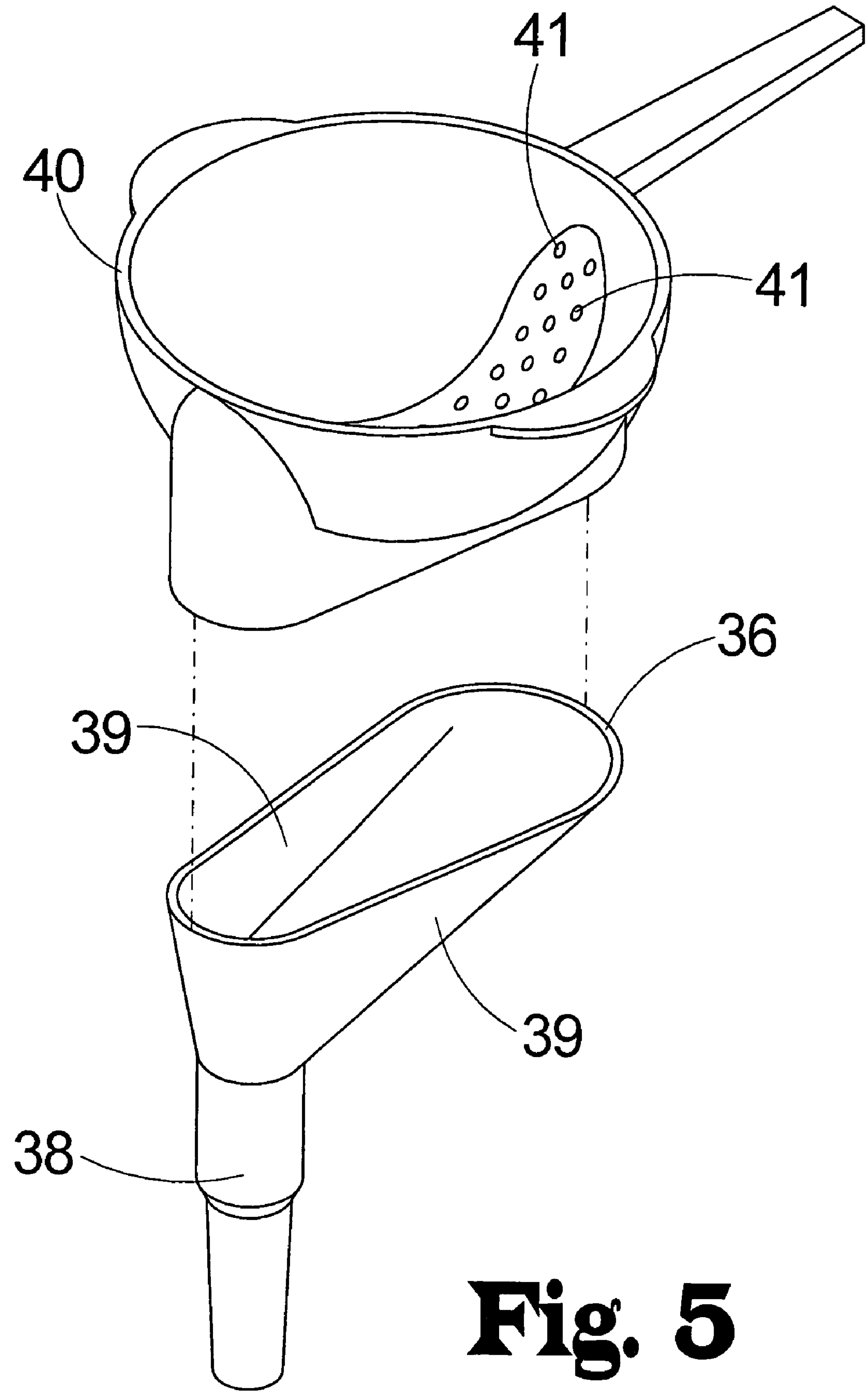
FIG. 5 is a perspective view of the meat draining member and the funnel member of the present invention.

In an embodiment, as shown in FIG. 2, the collection assembly 12 comprises a support member 42 32. The support member 42 32 is coupled to the bracket member 16 whereby the support member 42 32 is positioned in a spaced relationship to the bracket member 16. The support member 42 32 selectively receives the canister member 14 whereby the support member 42 32 is designed for supporting the canister member 14 above a bottom of the cabinet when the bracket member 16 selectively receives the canister member 14. The support member 42 32 of the collection assembly 12 comprises a perimeter wall 43 defining a saddle space 44 of the support member 42 32. The saddle space 44 of the support member 42 32 slidably receives the canister member 14 whereby a bottom portion of the canister member 14 is positioned in the saddle space 44 of the support member 42 32 and the perimeter wall 43 is positioned around the bottom portion of the canister member 14 to support the canister member 14 above the bottom of the cabinet.

Figure 6:
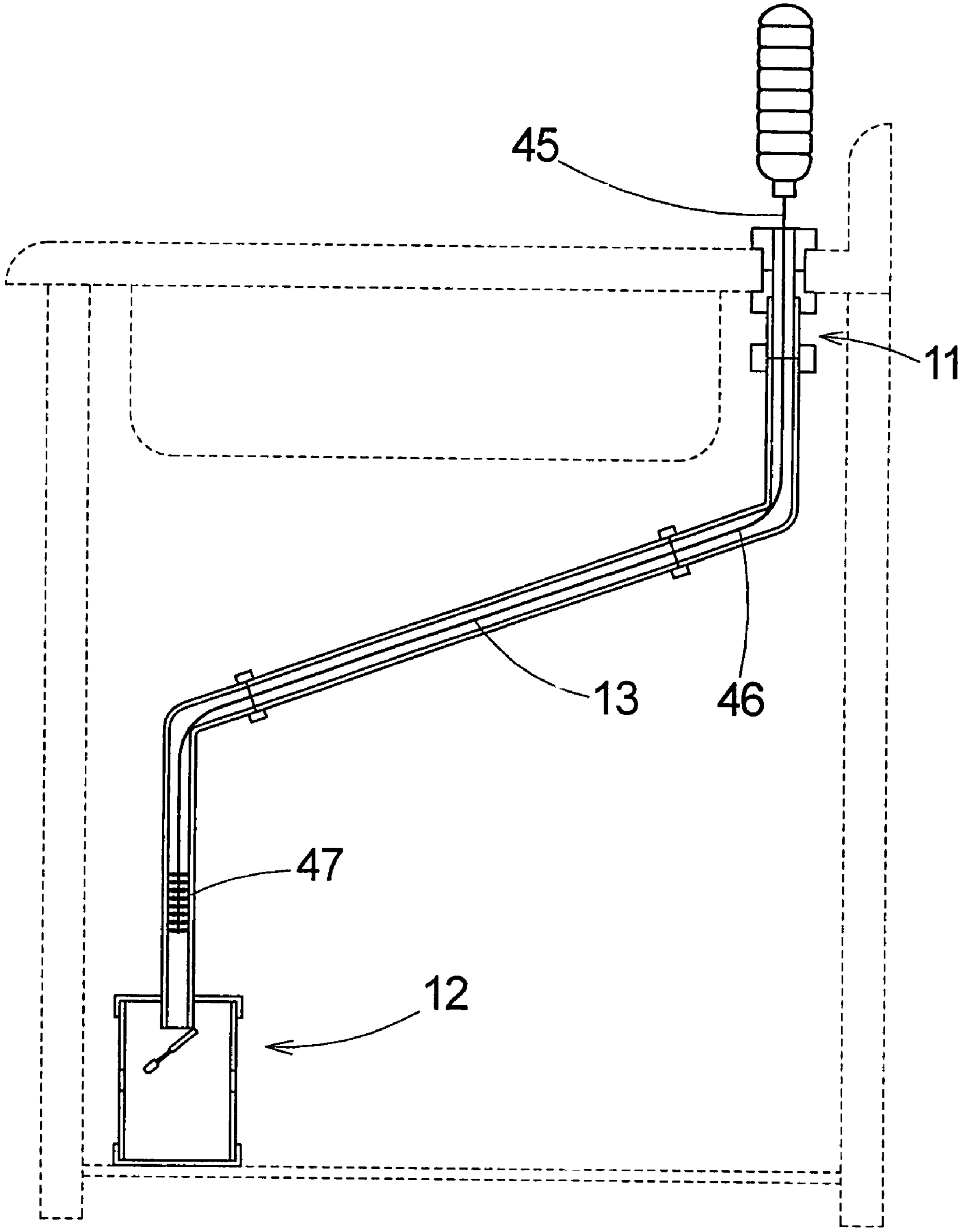
FIG. 6 is a cross-sectional view of the present invention showing the cleaning member inserted into the hose member.

In an embodiment, as shown in FIG. 6, a cleaning member 45 is selectively extended into the inlet assembly 11 and the hose member 13. The cleaning member 45 flexibly conforms to the hose member 13 to allow the cleaning member 45 to clean debris from the hose member 13. The cleaning member 45 comprises a body portion 46 and a cleaning portion 47. The cleaning portion 47 is coupled to the body portion 46 whereby the cleaning portion 47 is pushed through the hose member 13 by the body portion 46. The body portion 46 comprises a flexible material whereby the flexible material is for permitting the body portion 46 of the cleaning member 45 to conform to the shape of the hose member 13.

As can be seen in the drawing figures, and particularly in FIGS. 1, 2, and 6, the inlet assembly, the collection assembly, and the hose member are configured so as to be free of any liquid or fluid communication with any drain system of the sink, such as the drain system that is connected to a sanitary sewer system. As described above, and as can be seen particularly well in FIGS. 1, 2, and 6, the inlet assembly 11 is suitably mounted on a sink 1 having peripheral mounting flange portion 2, and the inlet assembly 11 is most suitably mounted on the flange portion 2 of the sink, which generally extends from an upper portion of the tub portion 3 of the sink 1. The tub portion 3 is generally depressed in relationship to the flange portion 2 such that the tub portion 3 catches and hold the fluids exiting the faucet 5 or otherwise deposited into the tub portion, and directs the fluids to the drain 4. As can be seen from the drawings, and particularly FIG. 2, the inlet assembly 11 and more specifically the port member 32 are mounted on the flange portion 2 of the sink 1 and thus are located outside of the tub portion 3 and the drain 4 mounted on the tub portion. Moreover, fluids in the tub portion 3 of the sink 2 are incapable of entering the port member 32 of the inlet assembly 11, as the port member 32 is not only outside of the tub portion 3 but the bore 33 of the port member 32 is located at a higher vertical level than the drain 4 such that fluids entering the tub portion 3 cannot enter the inlet assembly.

As understood by those skilled in the art, the drain 4 of the sink 1 is an open system that leads to and is in communication with a sanitary sewer system, so that fluids and other substances placed into the tub portion 3 flows through the drain and the connected plumbing to the sanitary sewer system. In contrast, the grease collection system 10 of the invention is a closed system in the sense that all fluids and debris that enter into the system 10 through the inlet assembly 11 are collected in the collection assembly 12, and are not allowed to pass through and enter the drain or sewer system. The collection system 10 thus collects and holds all of the fluids, as well as the grease, that is placed in the inlet assembly 11 of the system 10. Beneficially, the grease collection system 10 is not required to attempt to filter grease from fluids such as water that is the case with grease trap type systems. It is thus ideal for residential and other applications where the amount of grease generated is not high, and the user of the system is able to deposit what grease is generated into the system 10. The residential user is thus provided with the benefit of a grease disposal system without the cost and complication of a commercial or industrial type grease filtering system designed to filter grease out of the flow from a drain before the flow reaches the sanitary sewer system. In the inventive system, the grease never reaches the drain system of the sink.

In use, the user removes the plug member 35 from the port member 32 and places the neck portion 38 of the funnel member 26 into the bore 33 of the port member 32. The funnel member 26 is rotated a quarter turn to threadably engage the neck portion 38 of the funnel member 26 to the port member 32 to inhibit the funnel member 26 from falling out of the bore 33 of the port member 32. The user then pours the cooking grease into the funnel member 26 and cooking grease flows through the hose member 13 coupled to the port member 32 and into the bag member 26 positioned in the canister member 14 of the collection assembly 12. The lid member 19 is removed from the canister member 14 and the bag member 26 removed from the canister member 14 when the cooking grease has reached a predetermined level in the bag member 26. The sealing portion of the bag member 26 is used to seal the open end 29 of the bag member 26 and to allow the cooking grease to be disposed of without spilling of the cooking grease.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grease collection system for collecting and storing cooking grease disposed in said system by a user, the grease collection system comprising:

an inlet assembly designed for being coupled to a cabinet or flanging alongside a sink, said inlet assembly being adapted for receiving the cooking grease to be disposed of by the user;

a collection assembly being in fluid communication with said inlet assembly such that said collection assembly receives and stores the cooking grease from said inlet assembly for disposal by the user and comprising a removable funnel member; and a hose member being fluidly coupled between said inlet assembly anc said collection assembly to provide fluid communication between said inle assembly and said collection assembly for permitting the cooking grease tc flow from said inlet assembly to said collection assembly when said inlet assembly receives the cooking grease from the user;

wherein said inlet assembly, said collection assembly, and said hose member are configured so as to be free of any liquid communication with any drain system of the sink that is connected to a sanitary sewer system.

2. The grease collection system as set forth in claim 1, further comprising:

said collection assembly comprising a canister member, said canister member being selectively coupled to said hose member opposite said inlet assembly such that said canister member is adapted for receiving the cooking grease through said hose member when said inlet assembly receives the cooking grease from the user.

3. The grease collection system as set forth in claim 2, further comprising:

said collection assembly comprising a bracket member, said bracket member being adapted for being coupled to an interior of the cabinet, said bracket member selectively receiving said canister member such that said bracket member is adapted for selectively securing said canister member to the cabinet to inhibit inadvertent repositioning of said canister member with respect to said hose member.

4. The grease collection system as set forth in claim 3, further comprising:

said bracket member of said collection assembly comprising a base portion and a pair of arm portions, said base portion being adapted for being secured to the interior of the cabinet such that said base portion is for securing said bracket member to the cabinet, each of said arm portions being oppositely coupled to said base portion such that said arm portions are positioned around a portion of said canister member to inhibit movement of said canister member with respect to said hose member.

5. The grease collection system as set forth in claim 3, further comprising:

said collection assembly comprising a support member, said support member being coupled to said bracket member such that said support member is positioned in a spaced relationship to said bracket member, said support member selectively receiving said canister member such that said support member is adapted for supporting said canister member above a bottom of the cabinet when said bracket member selectively receives said canister member.

6. The grease collection system as set forth in claim 5, further comprising:

said support member of said collection assembly comprising a perimeter wall defining a saddle space of said support member, said saddle space of said support member slidably receiving said canister member such that a bottom portion of said canister member is positioned in said saddle space of said support member and said perimeter wall is positioned around said bottom portion of said canister member to support said canister member above the bottom of the cabinet.

7. The grease collection system as set forth in claim 1, further comprising:

said inlet assembly comprising a port member, said port member being adapted for being coupled to the cabinet, said port member comprising a bore extending through said port member such that said bore is adapted for permitting the cooking grease to be poured through said port member by the user, said hose member being coupled to said port member such that said hose member is in fluid communication with said bore of said port member to allow the cooking grease passing through said bore of said port member to flow to said collection assembly.

8. The grease collection system as set forth in claim 7, further comprising:

said inlet assembly comprising a plug member, said plug member threadably engaging said port member such that said plug member is selectively positioned in said bore of said port member, said plug member being for inhibiting access to said bore of said port member when said plug member is positioned in said bore of said port member, said plug member being adapted for inhibiting odor from escaping from said port member.

9. The grease collection system as set forth in claim 1, further comprising:

a cleaning member being selectively extended into said inlet assembly and said hose member, said cleaning member flexibly conforming to said hose member to allow said cleaning member to clean debris from said hose member.

10. The system of claim 1 wherein said inlet assembly is configured such that fluids entering any said drain system of said sink cannot enter said inlet assembly.

11. The system of claim 1 additionally comprising:

a sink having a peripheral mounting flange thereabout and a drain system connected to the sink and configured to receive fluids draining from said sink to a sanitary sewer system, said inlet assembly being mounted on said peripheral mounting flange of said sink.

12. The system of claim 11 wherein said inlet assembly is positioned on said sink such that fluids in said sink do not enter said inlet assembly and said collection assembly.

13. The system of claim 11 wherein said inlet assembly includes a port member with a bore in communication with said hose member; and a plug member removably mountable on said port member to block the bore when said plug member is mounted on said port member.

14. The system of claim 11 wherein said inlet assembly includes a port member with a bore in communication with said conduit; and wherein the funnel member removably mounted on said port member such that said funnel member is in fluid communication with the bore of said port member when said funnel member is mounted on the port member to funnel the grease into said port member to facilitate disposing of the cooking grease, said funnel member having a lower portion removably mountable into said bore of said port member.

15. The system of claim 14 additionally comprising a strainer member removably mountable on said funnel member and having a plurality of drain apertures extending through said strainer member such that substances placed in said strainer member are drawn by gravity through said drain apertures into said funnel member, said drain apertures blocking passage of pieces larger than said drain apertures to prevent the pieces from passing into said inlet assembly.

16. The system of claim 1 additionally comprising:

a sink having a peripheral mounting flange thereabout and a drain system connected to the sink and configured to receive fluids draining from said sink to a sanitary sewer system, said inlet assembly being mounted on said peripheral mounting flange of said sink;

wherein said inlet assembly is positioned on said sink such that fluids in said sink do not enter said inlet assembly and said collection assembly;

wherein said inlet assembly includes a port member with a bore in communication with said hose member and a plug member removably mountable on said port member to block the bore when said plug member is mounted on said port member;

a funnel member removably mounted on said port member such that said funnel member is in fluid communication with the bore of said port member when said funnel member is mounted on the port member to funnel the grease into said port member to facilitate disposing of the cooking grease, said funnel member having a lower portion removably mountable into said bore of said port member; and a strainer member removably mountable on said funnel member and having a plurality of drain apertures extending through said strainer member such that substances placed in said strainer member are drawn by gravity through said drain apertures into said funnel member, said drain apertures blocking passage of pieces larger than said drain apertures to prevent the pieces from passing into said inlet assembly.

17. A grease collection system for collecting and storing cooking grease disposed in said system by a user, the grease collection system comprising:

an inlet assembly designed for coupling to a cabinet such that said inlet assembly is positioned proximate a sink to receive cooking grease for disposal;

a collection assembly in fluid communication with said inlet assembly such that said collection assembly receives and stores the cooking grease passing through said inlet assembly;

a hose member being fluidly coupled between said inlet assembly and said collection assembly to provide fluid communication between said inlet assembly and said collection assembly for permitting the cooking grease to flow from said inlet assembly to said collection assembly when said inlet assembly receives the cooking grease from the user;

said inlet assembly comprising a port member including a bore extending through said port member with said bore being in fluid communication with said hose member to allow the cooking grease passing through said bore to flow to said collection assembly; and a funnel member removably mounted on said port member such that said funnel member is in fluid communication with said port member when said funnel member is mounted on the port member to funnel the cooking grease into said bore of said port member to facilitate disposing of the cooking grease.

18. The grease collection system as set forth in claim 17 wherein said funnel member comprises a neck portion and a funnel portion coupled to said neck portion, said neck portion threadably engaging said port member in a removable manner such that at least a portion of said neck portion is selectively positioned in said bore of said port member to inhibit said funnel member from inadvertently disengaging from said port member.

19. The grease collection system as set forth in claim 17, further comprising:

a draining member being selectively coupled to said funnel member, a plurality of drain apertures extending through said draining member such that said drain apertures permit fluid communication between said draining member and said funnel member, said draining member blocking passage of pieces larger than said drain apertures to prevent the pieces from passing into said inlet assembly.

20. A grease collection system for collecting and storing cooking grease disposed in said system by a user, the grease collection system comprising:

an inlet assembly designed for being positioned proximate to a sink having a drain system connected to a sanitary sewer system, the inlet assembly having a port member with a bore configured to receive cooking grease disposed by the user and comprising a removable funnel member mounted on the port member, the bore of the inlet assembly being positioned such that fluids in said sink do not drain into the bore of the port member of said inlet assembly;

a collection assembly configured to receive and store cooking grease; and a hose member being fluidly coupled to said inlet assembly and said collection assembly to provide fluid communication between said inlet assembly and said collection assembly for permitting the cooking grease to flow from said inlet assembly to said collection assembly when said inlet assembly receives cooking grease from the user;

wherein said inlet assembly, said collection assembly, and said hose member are configured so as to be free of any liquid communication with the drain system connected to a sanitary sewer system.

* * * * *